Jan. 30, 1940.  H. R. GRAYBILL  2,188,297
ANIMAL TRAP
Filed Dec. 8, 1938
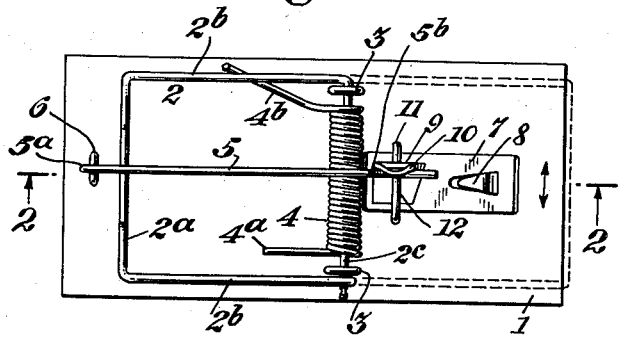
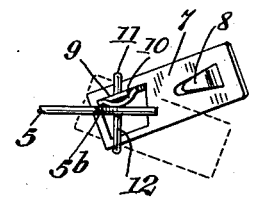
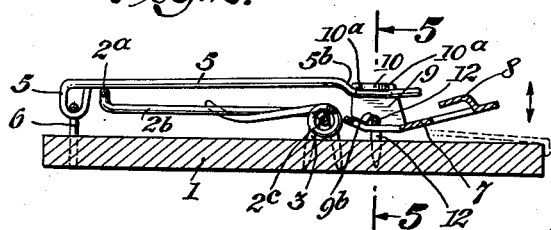
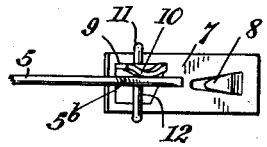
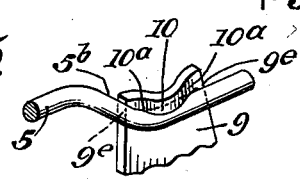
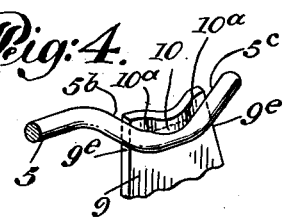
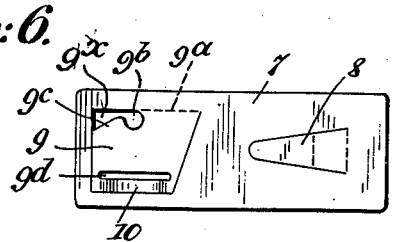
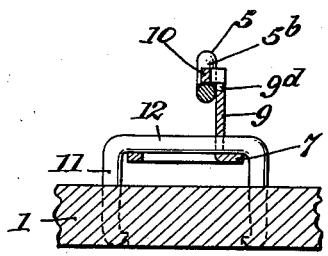
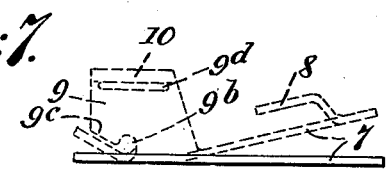
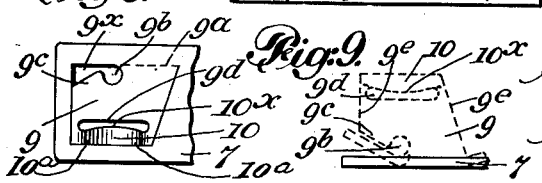
INVENTOR
Hershey Roy Graybill
BY
Louis Prevost Whitaker
ATTORNEY Patented Jan. 30, 1940

2,188,297

UNITED STATES PATENT OFFICE 2,188,297

ANIMAL TRAP

Hershey Roy Graybill, Manheim, Pa., assignor to Animal Trap Company of America, Lititz, Pa., a corporation of Pennsylvania Application December 8, 1938, Serial No. 244,516

14 Claims. (Cl. 43—81)

My invention consists in the novel features hereinafter described, reference being had to the accompanying drawing, which illustrates one embodiment of the same, selected by me for purposes of illustration, and the said invention is fully disclosed in the following description and claims.

My present invention is an improvement in traps, such as are used more particularly for catching mice and other small rodents, although it may be employed for other purposes. In the manufacture of traps of this character, it is essential that the construction shall be as simple as possible and as cheap as possible, consistent with its perfect operation, as they must be sold at retail for an exceedingly small price.

One of the features of my invention is the construction of the bait pedal in such a manner that all parts thereof are formed from a piece of sheet metal, substantially oblong in shape, which enables the manufacturer to produce them from a strip of metal of the required width without any waste of material whatever. Another feature of the invention is the formation of the trigger as a horizontally disposed vertical strip of metal, crimped or bent laterally to form a lip which engages the upper side of the locking bar with its lower edge so that the trigger is always maintained in a substantially horizontal position parallel to the upper face of the locking bar when in set position, and is not easily bent or distorted out of its proper position, as would be the case were the trigger formed by bending over a portion of the bait pedal into horizontal position.

Another feature of my invention is the provision for connecting the bait pedal at one side only with the pivot by which it is secured to the base, thereby permitting the trap to be released or sprung by lateral movement of the forward end of the bait pedal in either direction, as well as movement of the bait pedal vertically in either direction.

My invention also contemplates other features, all of which are fully set forth in the following description and claims.

Referring to the accompanying drawing,

Fig. 1 is a plan view of a trap embodying my invention, showing it in set position.

Fig. 1a is a detail plan view of a portion of the trap showing in full and dotted lines, respectively, the releasing of the locking bar by lateral movements of the forward end of the bait pedal in either direction.

Fig. 2 is a vertical section of Fig. 1, on the line 2—2.

Fig. 2a is a detail view of a portion of the trap showing the release of the locking bar by vertical movements of the outer end of the bait pedal in either direction.

Fig. 3 is an enlarged perspective view, illustrating the engagement of cam portions of the trigger with a vertically disposed cam portion formed on the locking bar.

Fig. 4 is a view similar to Fig. 3, in which the locking bar is provided with vertically disposed cam portions on opposite sides of the cam portions of the trigger.

Fig. 5 is a detail sectional view of the bait pedal, trigger and locking bar, showing the parts in set position.

Fig. 6 is a plan view of the blank for the bait pedal, showing the parts thereof cut out, previous to being struck up.

Fig. 7 is a side elevation of the blank, showing in dotted lines the died out parts struck or bent up to form the complete bait pedal.

Fig. 8 is a view similar to Fig. 6, of part of the bait pedal showing a slight modification.

Fig. 9 is a view similar to Fig. 7, of part of the bait pedal modified as in Fig. 8.

Referring to the drawing, I represents the base, which is usually constructed of wood, but may be made of any suitable material. 2 represents the pivoted jaw in the form of a bail, having the cross bar 2a, lateral arms 2b, and pivot 2c which passes through staples or screw eyes 3, 3, secured to the base, and is provided with a coil spring 4, one end 4a of which engages the base, and the other end 4b of which is an actuating arm which engages one of the lateral arms 2b of the jaw. It will be understood that the spring may be made in one piece or two coaxial sections as desired. 5 represents the locking bar, which has an eye 5a at the rear end of the trap engaging a staple 6 which secures it pivotally to the base, the other end of the locking bar being free to move in all directions.

7 represents the bait pedal which is preferably formed from an oblong piece of sheet metal, as shown in Fig. 7, which is died out and struck up or otherwise formed into its resultant shape, as illustrated in the other figures. The bait pedal has a tongue or projection 8 of any desired form to which the bait may be secured in the usual manner and which is struck up from the central portion of the blank adjacent to its forward end. Adjacent to the rear end of the blank it is provided with a portion 9 which is cut from the interior of the blank and bent upward into vertical position, on the dotted line 9a, to form the trigger support. The part 9 is provided adjacent to the line 9a with a pivot aperture, indicated at 9b, and with an inclined portion 9c which in the bent up position extends over the rear portion of the blank, as clearly indicated in Fig. 7, and forms a stop to limit the extent to which the said rear portion of the blank may be bent upwardly, as clearly shown in Fig. 5. A small portion of the metal is preferably cut out, as indicated at 9x, Fig. 6, to form an aperture communicating with the pivot aperture 9b to facilitate the operation of the bending tools, in effecting the bend at 9a, but this is not essential. The part 9 is also provided with a slot or slit 9d substantially parallel to the edge opposite the line of bend, indicated at 9a, leaving a narrow strip of metal 10, which is bent laterally as indicated clearly in Figs. 1 to 5, and forms the trigger of the trap. When the part 9 is bent up into its operative position, this trigger portion 10 will be supported vertically and will be bent or crimped inwardly so as to provide oppositely disposed cam portions 10a, 10a. This trigger is engaged by the upper face of the locking bar 5 in the set position of the trap and one or the other of said cam portions will engage the locking bar and disengage it from the trigger, when the bait holding portion of the bait pedal is moved upwardly or downwardly. The trigger portion 10 is bent inwardly far enough so that in the set position of the trap it will extend over to or slightly past the center of the portion of the locking bar which it engages, as shown in Fig. 5, the locking bar lying against the inner face of the trigger support when in set position, so that there is little danger of the trap being accidentally sprung. At the same time it will be noted that the upward strain of the locking bar on the trigger will be against the lower edge of the inwardly bent or crimped portion 10 constituting the trigger, so that there will be practically no danger of the trigger being bent upwardly with respect to the trigger support, which would make it practically impossible to set the trap, or downwardly with respect thereto, which would make it practically impossible to release the trap. This construction has been found to be much more satisfactory than to form a trigger by merely bending over a flap portion of the metal, which may easily be bent or sprung upwardly or downwardly, and in any case would require extreme precision in its manufacture.

I do not wish to be limited to the exact construction of the pedal, as just described, as slight variations may be made therein without departing from my invention. For example, in some instances the slit or slot indicated at 9d in Fig. 6, may have its outer edge curved inwardly as shown at 10x in Fig. 8, so that when the trigger support 9 is bent into vertical position, as indicated in dotted lines in Fig. 9, and the trigger portion 10 is bent inwardly to provide the oppositely disposed cam portions 10a, 10a, previously described, this curved edge will form the lower edge of the trigger and will be in the form of a curve with the central part lower than the two ends. This is advantageous in giving a better engagement with the locking bar while permitting easy disengagement by movement of the forward end of the pedal in any of the four directions previously referred to. It will also be understood that the trigger support and trigger might be formed separately from the main portion and secured thereto, the main portion being in such case formed of wood or metal or other suitable material. While it is preferred to form the pedal complete as a died and struck up part, it is obvious that it might be made by die casting or otherwise, if found desirable.

The bait pedal is secured to the base preferably by means of a staple 11 having the horizontal or pivot portion 12 thereof extending through the aperture 9b formed in the trigger support, which is, as will be seen, located considerably to one side of the central portion of the bait pedal, thus securing the bait pedal to the base in operative position while permitting its outer end to be moved upwardly and downwardly, as indicated in Figs. 2 and 2a, or laterally in either direction, as indicated in Fig. 1a. The staple 11 will obviously be made of such width as to accommodate the bait pedal to prevent the rear portion at the opposite side from the trigger support to escape from beneath it during such lateral movements, as indicated in Fig. 1a.

It will be seen that the entire bait pedal is formed simply and conveniently from the oblong blank, and has no part extending beyond the lateral edges of the blank. Consequently, these bait pedals can be died and struck or bent up without any waste of material whatever. If desired, the upward bending of the rear end of the bait pedal to bring it into contact with the stop portion 9c of the trigger support can be effected after the bait pedal and its pivot staple have been assembled and attached to the base, although this is not essential.

In order to set the trap, the jaw is swung from the released position, indicated in dotted lines in Figs. 1 and 2, over to the set position, indicated in full lines in Figs. 1 and 2, and the locking bar is folded over the crossbar 2a of the jaw and its forward end placed below the trigger 10, the upward pressure of the spring jaw on the locking bar holding it firmly in set position with respect to the trigger. In this position of the trap, which is indicated in Figs. 1 and 2, it is clear that the disengagement of the trigger from the locking bar will be effected by a movement of the pedal in any one of four different directions, that is to say, up or down and sidewise to the right or left. In moving the forward end of the pedal to one side or the other of its normal set position, the trigger support 9 will be turned so as to bring one or the other of its edges 9e (see Figs. 3 and 4 for example), into engagement with the locking bar and disengage it from the trigger or lip 10. If the forward end of the pedal is moved upwardly or downwardly, one or the other of the cam portions 10a will be brought into contact with the side of the locking bar, with the effect of pushing it laterally out of engagement with the trigger, and obviously as soon as it is moved with respect to the trigger, past the center of the locking bar, see Fig. 5, it will instantly release itself, owing to the fact that the locking bar is formed of wire and is circular in cross section, as therein shown.

In order to make the trap more sensitive, I prefer to provide the locking bar in rear of the trigger, as indicated in Fig. 3, or both in rear and forward of the pedal, as shown in Fig. 4, with substantially vertically disposed portions, or bent portions, the exterior rounded faces of which form cam portions, indicated at 5b and 5c, which will instantly be engaged by the cam portions 10a of the trigger, by a movement of the pedal in any upward or downward direction, and act to instantly move the locking bar when in set position, sufficiently to disengage the trigger therefrom and release the trap.

The construction herein shown and described is extremely efficient in operation, and can be extremely cheaply made for the reasons previously set forth.

What I claim and desire to secure by Letters Patent is:

1. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, and means for pivotally connecting said bait pedal with the base.

2. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, said lip having oppositely disposed cam portions, and means for pivotally connecting said bait pedal with the base.

3. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, and means for pivotaly connecting said bait pedal with the base adjacent to one side only of the bait pedal to permit it to move vertically and also laterally with respect thereto, to disengage the trigger from said locking bar.

4. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, said lip having oppositely and horizontally disposed cam portions, and said locking bar being provided adjacent to its free end with substantially vertically disposed cam portions to be engaged by the cam portions of the trigger when the latter is moved to spring the trap, and means for pivotally connecting the bait pedal to the base.

5. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, said trigger support being provided with an aperture, and a pivotal connection between the bait pedal and the base having a pivot extending through said aperture, and permitting movement of the bait pedal in opposite directions both vertically and laterally.

6. A trap comprising a base, a pivoted spring actuated jaw, a locking bar pivotally connected to the base, and a bait pedal formed of sheet metal having a vertical trigger support struck up from portions of the metal between its lateral edges, and supporting a trigger formed by a vertical strip of the metal partially severed from the upper end of the trigger support and crimped laterally, to form a lip for engaging the locking bar, said trigger support being provided with an aperture, and a pivotal connection between the bait pedal and the base having a pivot extending through said aperture, and permitting movement of the bait pedal in opposite directions both vertically and laterally, said trigger support being provided with a pivot aperture, and an upwardly inclined edge extending rearwardly therefrom above the rear portion of the bait pedal, and forming a stop, the rear portion of the bait pedal being bent upwardly substantially into contact with said stop, and means for securing the bait pedal to the base including a pivot extending through the said aperture in said trigger support.

7. A trap comprising a base, a pivoted spring actuated jaw, a locking bar pivotally connected to the base at its rear end, and a bait pedal formed of sheet metal, having a portion cut from between its edges and struck up to form a trigger support, and having a pivot aperture at its lower end and an inclined stop portion extending therefrom above the rear portion of the pedal, said support carrying at its upper end a trigger formed by a horizontal vertically disposed strip of the metal thereof partially severed therefrom, and crimped to one side of said support to provide a lip having oppositely inclined cam portions, the lower edge of said lip being engaged by the locking bar in the set position of the trap, said locking bar having substantially vertically disposed cam portions for engaging one or both of the cam portions of the trigger to facilitate the release of the jaw, and means for connecting the bait pedal with the base having a pivot extending through the pivot aperture in the trigger support.

8. A trap comprising a base, a pivoted spring actuated jaw, a locking bar connected to the base, a bait pedal having a vertical sheet metal trigger support, provided with a trigger formed by a vertically disposed horizontal strip of the metal partially severed from the upper end of the trigger support and crimped laterally to form a lip, the lower edge of which engages the locking bar, in the set position of the trap, and means for pivotally connecting the bait pedal with the base.

9. A trap comprising a base, a pivoted spring actuated jaw, a locking bar connected to the base, a bait pedal having a vertical sheet metal trigger support, provided with a trigger formed by a vertically disposed horizontal strip of the metal partially severed from the upper end of the trigger support and crimped laterally to form a lip, the lower edge of which engages the locking bar, in the set position of the trap, said lip having oppositely disposed cam portions for engaging the locking bar when the forward end of the bait pedal is moved upwardly or downwardly, while in set position, to release the locking bar, and means for pivotally connecting the bait pedal to the base.

10. A trap comprising a base, a pivoted spring actuated jaw, a locking bar connected to the base, a bait pedal having a vertical sheet metal trigger support, provided with a trigger formed by a vertically disposed horizontal strip of the metal partially severed from the upper end of the trigger support and crimped laterally to form a lip, the lower edge of which engages the locking bar, in the set position of the trap, said lip having its lower edge curved downwardly at its central portion, and having horizontal oppositely disposed cam portions for engaging the locking bar and disengaging it from the trigger by movement of the forward end of the bait pedal upwardly or downwardly, and means for pivotally securing the pedal to the base.

11. A trap comprising a base, a pivoted spring actuated jaw, a locking bar connected to the base, a bait pedal having a vertical sheet metal trigger support, provided with a trigger formed by a vertically disposed horizontal strip of the metal partially severed from the upper end of the trigger support and crimped laterally to form a lip, the lower edge of which engages the locking bar, in the set position of the trap, said trigger support being located adjacent to one side of the trigger, and provided with a pivotal aperture, and a pivot secured to the base, and engaging said pivotal aperture, whereby the trap may be sprung by movement of the forward end of the pedal vertically or horizontally in either direction.

12. A trap, comprising a base, a pivoted spring actuated jaw, a locking bar pivotally connected to the base, a bait pedal provided with a vertically and longitudinally disposed trigger support, located at one side of the longitudinal center of the pedal, and provided with a trigger extending laterally therefrom, at its upper end, for engaging the locking bar and having a pivotal aperture adjacent to its lower end, and a pivot connected with the base and engaging said pivotal aperture and forming the only pivotal connection for the pedal, whereby the trap may be sprung by movement of the forward end of the pedal vertically or laterally in either direction.

13. A trap comprising a base, a pivoted spring actuated jaw, a locking bar pivotally connected to the base, and a bait pedal formed of sheet metal having a vertical trigger support struck up from portions of the metal between its lateral edges, and bent upward along a line adjacent to one side of the pedal, and provided with an integral trigger extending laterally therefrom, and means for pivotally connecting said bait pedal with the base.

14. A trap comprising a base, a pivoted spring actuated jaw, a locking bar pivotally connected to the base, and a bait pedal formed of sheet metal having a vertical trigger support struck up from portions of the metal between its lateral edges and bent upward along a line adjacent to one side of the pedal, and provided with an integral trigger extending laterally therefrom, and means for pivotally connecting the bait pedal to the base adjacent to one side only of the bait pedal to permit its forward end to move vertically and also laterally in either direction to disengage the trigger from the locking bar when in set position.

HERSHEY ROY GRAYBILL.